July 8, 1941.　　J. D. McKAHIN　　2,248,505
AGRICULTURAL IMPLEMENT
Filed March 30, 1939　　4 Sheets-Sheet 1

July 8, 1941. J. D. McKAHIN 2,248,505
AGRICULTURAL IMPLEMENT
Filed March 30, 1939 4 Sheets-Sheet 3

Inventor
J. D. McKahin
by
Attorney

July 8, 1941. J. D. McKAHIN 2,248,505
AGRICULTURAL IMPLEMENT
Filed March 30, 1939 4 Sheets-Sheet 4

Inventor
J. D. McKahin
by
Attorney

Patented July 8, 1941

2,248,505

UNITED STATES PATENT OFFICE 2,248,505

AGRICULTURAL IMPLEMENT

John D. McKahin, La Crosse, Wis., assignor to Allis-Chalmers Manufacturing Company, Milwaukee, Wis., a corporation of Delaware Application March 30, 1939, Serial No. 264,889

19 Claims. (Cl. 97—47)

The invention relates to tractor drawn implements for conditioning farm soil, and to machinery of like character in which draft is transmitted from a propelling vehicle to a trailing vehicle. More specifically the invention relates to tractor drawn implements of the type in which a tool or tools are supported by a frame which is sustained in an elevated position above the ground by a forward supporting connection with the tractor and by a rearward ground traversing support, such as a wheel supported axle.

It is an object of the invention to provide an improved hitch between the tractor and the implement, which hitch combines with the function of transmitting draft from the tractor to the implement the function of sustaining the implement frame at its forward end, and at the same time possesses such flexibility as is necessary or desirable for satisfactory operation of the implement. The flexibility of the hitch is preferably such as to permit horizontal angling of the tractor relative to the implement when the tractor is driven to the right or left from a straight line of travel, and to permit vertical rocking of the tractor about an axis extending transversely to its direction of propulsion, without imparting substantial up or down movements to the implement frame. Flexibility of the hitch to permit rocking of the tractor about a transverse axis without imparting substantial up or down movements to the implement is desirable in operating the machine on uneven ground, and in order to improve the hitch still further for operation of the machine on uneven ground, the hitch is preferably so constructed as to also afford pivotal movement between the tractor and implement about an axis extending substantially in the direction in which draft is transmitted from the tractor to the implement.

Another object of the invention is to provide a hitch of the mentioned character with means to resist sagging of the hitch when the propelling and trailing vehicles are moved into horizontally angled positions relative to each other.

Another object of the invention is to provide an improved implement of the mentioned character in which a tool or tools are mounted on the implement frame and in which the tool or tools may be raised and lowered relative to the ground by vertical adjustment of the implement frame. As stated, the implement frame is sustained at its front on the tractor and at its rear on a ground traversing support, and more specifically a hitch is contemplated which not only transmits draft from the tractor to the implement but also transmits the weight at the forward end of the implement to the tractor and affords the necessary or desired flexibility for satisfactory operation of the implement. According to the invention mechanism for vertically adjusting the implement frame is so arranged as to move the frame vertically relative to the tractor without vertically moving the load sustaining connection between the hitch and the tractor, the hitch and the rear support performing their load sustaining functions in any vertically adjusted position of the implement frame. In this connection it is a further object of the invention to provide an improved mechanism for raising and lowering the implement frame with a substantially parallel motion relative to the ground.

Another object of the invention is to provide an improved raising and lowering mechanism for the implement frame, which mechanism may be conveniently manipulated by a driver seated on the tractor.

These and other objects and advantages of the invention will be apparent from the following detailed description of the devices shown in the accompanying drawings and embodying the principles of the invention. While a farm type tractor and a planter have been shown in the drawings and the invention is hereinafter explained in connection with these particular types of tractor and implement, it should be understood that it is not intended to limit the invention to the use of any particular type of tractor or, in its broader aspects, to any specific type of implement. Nor is it intended to limit the invention to the details of construction shown and described, for various modifications within the scope of the appended claims may occur to persons skilled in the art.

Referring to the drawings:

Fig. 5 is a schematic side view of a tractor, this view showing the complete tractor whose rear end is shown in Figs. 1, 2 and 4;

Fig. 6 is a detail top view of the front end of the planter;

Fig. 7 is a detail view on line VII—VII of Fig. 1;

Fig. 8 is a detail view on line VIII—VIII of Fig. 1;

Fig. 9 is a view on line IX—IX of Fig. 1 showing details at the left side of the tractor;

Fig. 10 is a side view of the parts shown in Fig. 9;

Fig. 11 is a detail view of a bracket shown in Figs. 9 and 10, and

Figure 1:
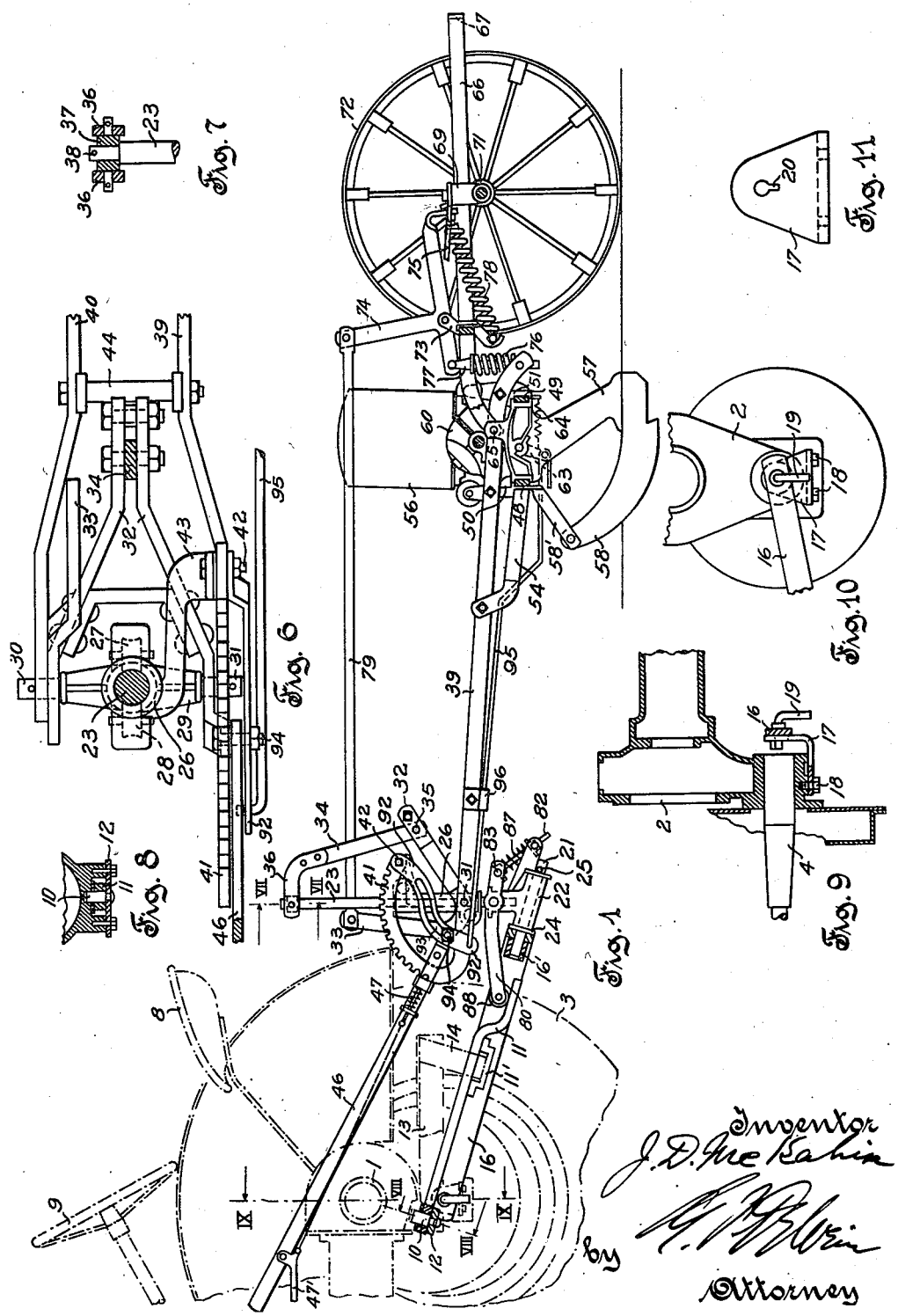
Fig. 1 is a side view of a planter and its hitch connection with a tractor, only the rear end of the tractor being shown in Fig. 1, and the furrow openers of the planter being shown in lowered position.

Referring to Fig. 1, a planter is shown in trailing position behind a tractor, only the rear end of the tractor being shown in Fig. 1 and a schematic side view of the entire tractor being shown in Fig. 5. The tractor comprises a transversely extending rear axle housing 1 which encloses the usual differential mechanism and differential drive shafts. Secured to each end of the rear axle housing 1 is a depending side casing 2, the one at the left side of the tractor being more clearly shown in Figs. 9 and 10, and the construction of the side casings being the same at both sides of the tractor. Rear traction wheels 3 are mounted on stub axles 4 projecting from the lower ends of the side housings 2. Front steering wheels 5 are located forwardly of the rear traction wheels closely adjacent to the longitudinal center of the tractor as is usual in farm tractors, and the main body of the tractor including an engine unit 6 and a power transmitting unit 7 is supported at front and rear, respectively, on the front wheels 5 and the rear wheels 3. A driver's seat at the rear end of the tractor is indicated by the reference character 8, and 9 indicates a steering wheel connected with the front steering wheels 5. Referring to Fig. 1 in which the near rear wheel of the tractor has been omitted, a draw bar coupling pin 10 is shown seated in a recess of the rear axle housing 1. The coupling pin extends through the forward end of a draw bar 11 which is part of the standard equipment of the tractor. Referring to Fig. 8, a plate member 12 bolted to the rear housing 1 holds the coupling pin 10 and the forward end of the draw bar 11 in place. Extending rearwardly from the rear axle housing on opposite sides of the draw bar 11 are a pair of angle irons 13 which are connected by a transverse bracket 14, the draw bar 11 resting on the bracket 14 and being secured against swinging movement laterally thereof by stops on the bracket 14, one of these stops being indicated by the reference character 15 in Fig. 4. A strap 11' secured to the under side of the draw bar restrains upward separation of the draw bar from the bracket 14, and a platform 13' is mounted on the angle irons 13.

A hitch yoke 16 for connecting the planter with the tractor is mounted on the depending side casings 2 of the tractor, the hitch yoke having rearwardly converging arms each of which is connected at its forward end with the tractor in the manner more clearly shown in Figs. 9, 10 and 11. These figures show the connection between the hitch yoke and the side casing 2 at the left side of the tractor, and a construction corresponding to that shown in Figs. 9, 10 and 11 is used for connecting the hitch yoke with the side casing 2 at the right side of the tractor. As shown in Figs. 9 and 10 a bracket 17 is secured to the lower portion of the side casing 2 by means of bolts 18. The bracket 17 has an upright side portion to which the corresponding arm of the hitch yoke 16 is pivotally and detachably secured by means of an L-shaped coupling pin 19. The aperture in the bracket 17 for reception of the coupling pin 19 has a slotted extension 20 as shown in Fig. 11, and the arm of the hitch yoke 16 has a similarly shaped aperture for the reception of the coupling pin 19. The purpose of the slotted extension of the apertures in the bracket 17 and the hitch yoke 16 is to permit passage of a lug on the pin 19 which serves to hold the coupling pin 19 in position against withdrawal from the bracket 17 after the pin has been inserted and turned about its pivot axis into the position in which it is shown in Fig. 9. The pivotal mounting of the hitch yoke 16 on the side casing 2 at the left side of the tractor, as shown in Fig. 9, is duplicated at the right side of the tractor as stated, and it will be noted that the horizontal portions of the pivot pins 19 extend coaxially with the stub axles 4 and therefore with the axis of the rear wheels 3 of the tractor. By this construction the hitch yoke 16 may swing vertically relative to the tractor about an axis coinciding with the axis of the rear traction wheels 3 of the tractor.

At the rear end of the hitch yoke 16 a brace 16' is secured to the arms of the hitch yoke, and a pivot pin 21 has a forward end securely mounted in the transverse rear portion of the hitch yoke and in the brace 16', the pivot pin extending rearwardly from the hitch yoke 16 in a vertical plane centrally and longitudinally of the tractor. A knuckle for connecting the planter with the hitch yoke 16 comprises a T-shaped bracket 22 which has a sleeve portion journaled on the pivot pin 21 and a cylindrical standard 23 which is securely fastened in another sleeve portion of the bracket 22 and extends transversely to the pivot axis of the pin 21. Interposed between the forward end of bracket 22 and the short transverse rear portion of the hitch yoke is a washer 24 and a cotter pin and washer 25 on the outer end of the coupling pin 21 hold the bracket 22 in axially fixed position on the pivot pin 21.

Figure 2:
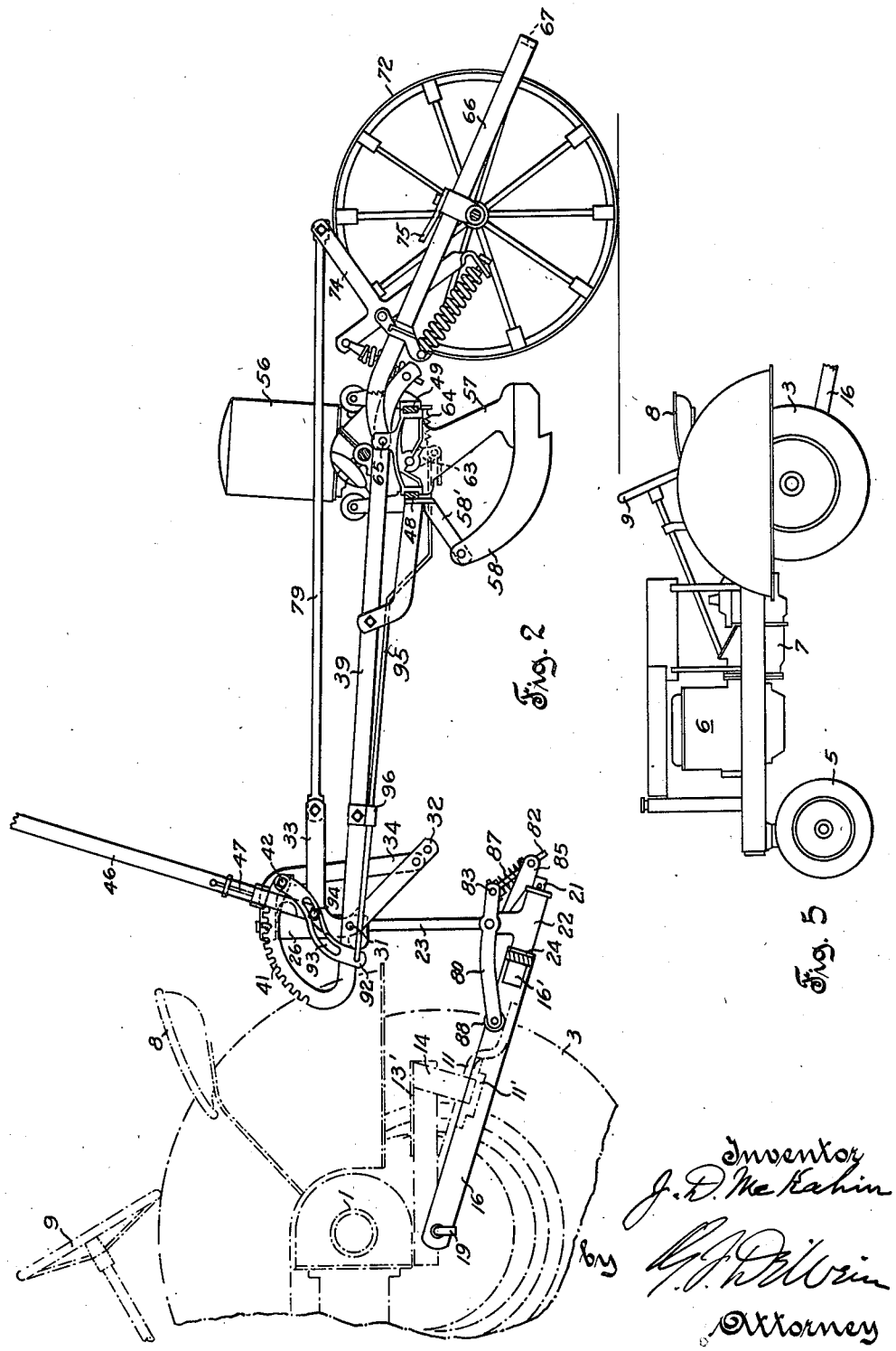
Fig. 2 is a view similar to Fig. 1 with the furrow openers of the planter shown in raised position.
Figure 4:
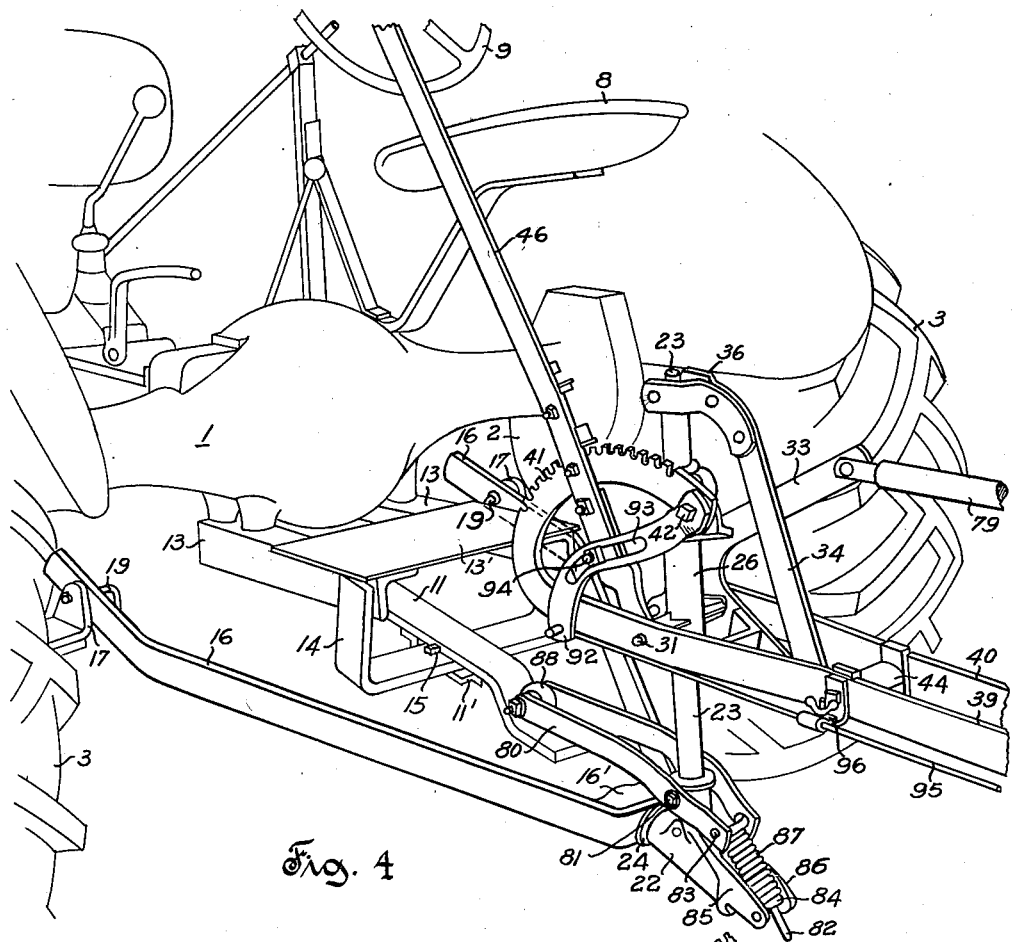
Fig. 4 is a perspective view of the hitch connection between the rear end of the tractor and the front end of the planter shown in Figs. 1, 2 and 3.

In normal operation of the machine the standard 23 extends in a substantially vertical direction as indicated in Figs. 1, 2 and 4. A hitch guide coupling 26 embraces the standard 23 and is slidable longitudinally thereof, an upper roller 27 being mounted in a rearward extension of the hitch guide coupling, and a lower roller 28 being mounted in a forward extension at the lower end of the hitch guide coupling, the rollers bearing against the standard 23 and serving to reduce friction during up and down movement of the hitch guide coupling 26 relative to the standard 23. As best shown in Fig. 6 the hitch guide coupling 26 has a transverse portion 29 extending in opposite directions from the central lower portion of the hitch guide coupling and terminating in trunnions 30 and 31. Pivotally mounted on the trunnions 30 and 31 is a lever which has a bifurcated arm 32, the outer end of which is movable in a plane extending through the axis of the standard 23 at right angles to the axis of the trunnions 30 and 31. Another arm 33 of the lever is arranged laterally of the mentioned plane and extends angularly relative to the arm 32. A link 34 is pivotally connected at its lower end at 35 with the rearward portion of the lever arm 32 and has a curved bifurcated upper portion 36 which is pivoted on a trunnioned collar 37 journaled on a reduced upper portion of the standard 23 as shown in Fig. 7. The trunnioned collar 37 is retained on the standard 23 by means of a cotter pin 38.

A forward frame section of the planter comprises side members 39 and 40 which are supported at their forward ends on the trunnions 30 and 31 of the hitch guide coupling 26. The left side member 39 of the forward frame section of the planter is extended forwardly a short distance beyond the trunnion 31 and then curved upwardly on an arc extending concentrically with the trunnion 31. The curved portion of the frame member 39 is indented to form a latch segment 41, the rear end of the segment being secured by means of a bolt 42 to an arm 43 extending laterally and rearwardly from the hitch guide coupling 26 as best shown in Fig. 6. The side members 39 and 40 of the forward frame section of the planter are rigidly connected with each other by braces 44 and 45, and it will be seen that while the double armed lever 32, 33 is swingable relative to the hitch guide coupling 26 about the trunnions 30 and 31, the frame section 39, 40 is fixed relative to the hitch guide coupling 26. An actuating arm 46 is rigidly secured to the bifurcated lever arm 32 at the side of the standard 23 opposite to the arm 33, the actuating arm 46 carrying a retractable latch dog 47 which lockingly engages the latch segment 41 and may be operated in the usual manner by means of a latch lever 47' pivoted at the outer or handle end of the actuating arm 46.

A runner frame comprising frame bars 48 and 49 extends transversely of the forward frame section 39, 40 near the rear end thereof, the frame bar 48 being secured to the frame section 39, 40 by means of a bracket 50 and the frame bar 49 being secured to the forward frame section 39, 40 by means of a bracket 51. Extending between the frame bars 48 and 49 at opposite sides of the brackets 50 and 51 are connecting arches 52 and 53 to which the frame bars 48 and 49 are rigidly secured, and forwardly converging braces 54 and 55 secure the runner frame in right angle relation to the forward frame section 39, 40 of the planter.

Figure 3:
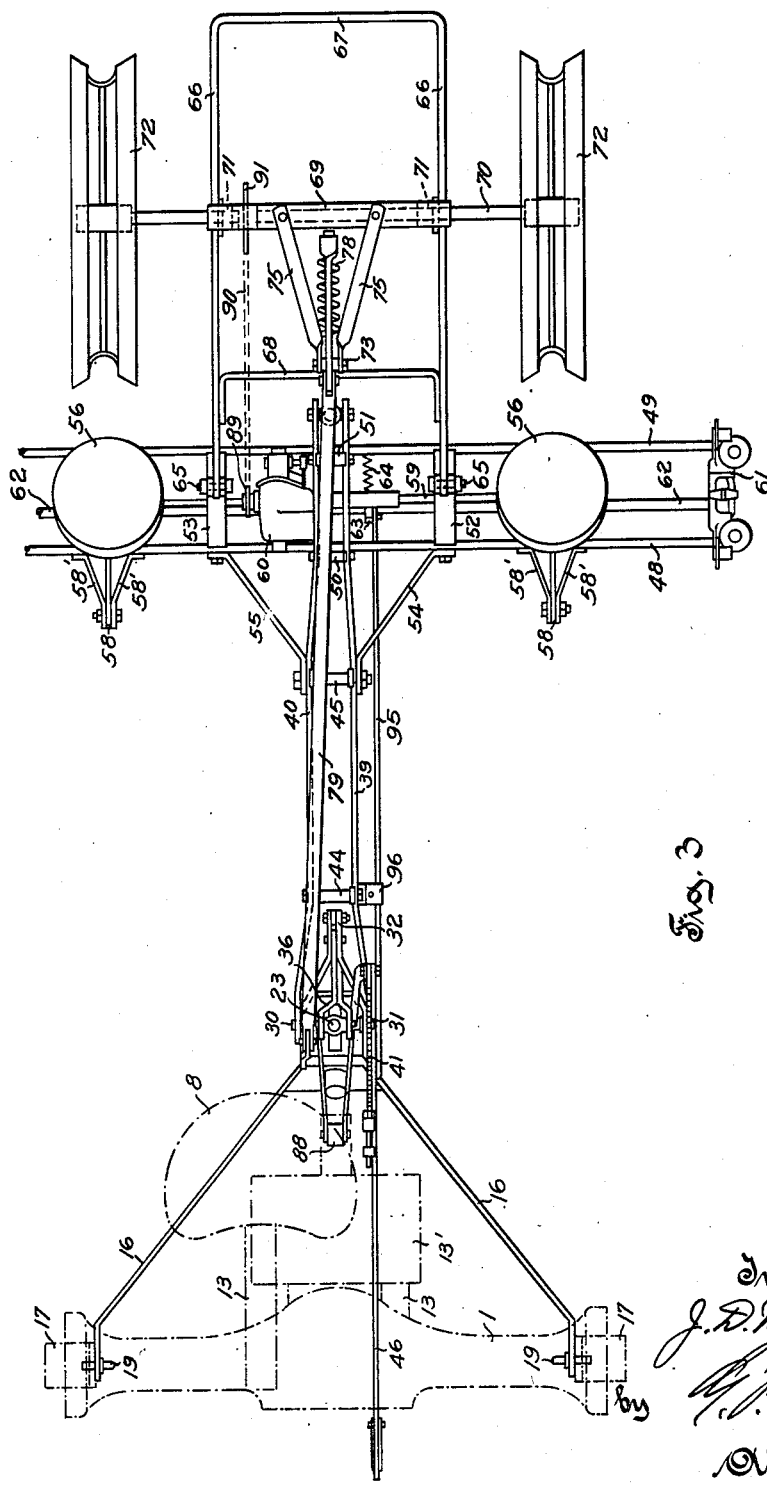
Fig. 3 is a top view of the machine shown in Figs. 1 and 2.

As shown in Fig. 3 the runner frame 48, 49 carries two planting units each comprising a seed can 56 and suitable furrow openers and seed depositing mechanism. The seed depositing mechanism includes a planter shank 57 shown in Fig. 1, and a furrow opener 58 is secured at its rear end to the planter shank and has braced connections 58' with the forward transverse bar 48 of the runner frame. Also mounted on the runner frame is a seeder shaft 59 for driving the seed feeding mechanism of the seed cans, the seeder shaft 59 having driving connection with a power transmitting mechanism 60 which is also mounted on the runner frame. A check head is mounted on each end of the runner frame, as indicated at 61 in Fig. 3, and the forks of the check heads actuate a rocker shaft 62 operatively connected with the power transmitting mechanism 60. The rocker shaft 62 carries an arm 63, shown in Fig. 1, and a spring 64 connected with the arm 63 and the rear frame bar 49 of the runner frame tends to move the rocker shaft into a position in which it causes interruption of the driving connection between the power transmission mechanism 60 and the seeder shaft 59, and in which the valve mechanisms of the planter units prevent discharge of seed, the operation of the planter in this respect conforming with standard practice.

Pivotally secured to the connecting arches 52 and 53 of the runner frame at 65 are rearwardly extending side bars 66 of a rearward section of the planter frame. The side bars 66 are connected at their rear ends by a transverse frame portion 67, and a brace 68 is interposed between the side bars 66 a short distance behind the pivotal connections 65 between the rearward frame section and the runner frame. Another transverse brace 69 is secured to the frame bars 66 rearwardly of the brace 68, the brace 69 having downwardly projecting bracket portions in which an axle 70 is mounted by means of bearings 71. The axle 70 is supported at opposite ends on a pair of ground wheels 72 of the type usually employed in planter design. Pivotally mounted on the rearward frame section of the planter by means of a bracket 73 secured to the brace 68, is a T-shaped lever 74, the bracket 73 being braced by rearwardly extending bars 75 secured to the transverse brace 69 as best shown in Fig. 3. The lever 74 has a lower fore and aft extending arm which is resiliently connected at its forward end with the rear end of the forward frame sections 39, 40 by suitable connecting means including a spring 76 and a pin 77. A tension spring 78 is connected at one end with the brace 68 of the rearward frame section of the planter, and the other end of the spring 78 is connected with the rear end of the lower portion of the lever 74. The upstanding arm of the lever 74 is connected with the double armed lever 32, 33 pivoted on the hitch guide coupling 26, this connection being made by means of a link 79 which is pivotally connected at its forward end with the arm 33 and at its rearward end with the upstanding arm of the lever 74.

In operation, the furrow openers of the planter are adjusted for penetrating the soil at a desired depth and it should be noted that the depth of soil penetration of the furrow openers may be regulated by adjustment of the lever 46. In the position of this lever as shown in Fig. 1 the furrow openers occupy a position of maximum soil penetration, and movement of the lever 46 in an upward direction will cause an upward movement of the hitch guide coupling 26 on the standard 23 due to the link connection between the arm 32 and the upper end of the standard 23, and at the same time the rear end of the forward frame section of the planter will be moved upwardly relative to the axis of the planter wheels 72 by pivotal movement of the lever 74 relative to the rear frame section 66, 67. The rearward thrust imparted to the link 79 by an upward movement of the lever 46 moves the lever 74 in a rearward direction, which movement is transmitted through the pin 77 to the rear end of the forward frame section 39, 40 of the planter. The tension of spring 78 tends to assist lifting of the furrow openers from a lowered to a raised position. Fig. 2 shows the position of the parts when the furrow openers are raised to their extreme elevated position above the ground. It should be noted that in moving the planter from the position shown in Fig. 1 into the position shown in Fig. 2, the forward frame section 39, 40 and the runner frame 48, 49 move substantially parallel to the ground, and the planter shank moves substantially on a straight line at right angles to the ground level, the arrangement of the lifting mechanism being such that when the hitch guide coupling is moved a given distance axially of the standard 23 the pivot connection 65 between the front and rear sections of the planter frame is moved the same amount in the same direction. The mentioned movement of the planter shank in a rectilinear path is a desirable feature in a check-row planter because with such an arrangement the seed will always be deposited in the same relation to the buttons of the check wire irrespective of whether the furrow openers run deep or shallow.

From the raised or transport position of the planter as shown in Fig. 2, the furrow openers may be lowered towards the ground by manipulation of the hand lever 46 in a forward direction from the position in which it is shown in Fig. 2, and when the furrow openers 58 engage the ground continued movement of the lever 46 in a forward direction will exert a downward force upon the furrow openers through the spring 76. If the furrow openers are lowered while the tractor is at a standstill, and soil conditions are such that the furrow openers cannot readily penetrate the ground, the spring 76 will be compressed by forward movement of the lever 46, but the furrow openers will cut into the soil as soon as the tractor is set in motion.

It should be noted that the standard 23 of the knuckle cooperates with the hitch guide coupling 26 to resist sagging of the planter frame and hitch yoke 16 between the forward and rearward supports, respectively, afforded by the tractor and by the wheeled axle 70, and that the planter frame and hitch yoke are retained in vertically fixed position relative to each other by the forward adjusting mechanism comprising the lever 32, 33 and the link 34, 36. The forward end of the planter will therefore be sustained on the tractor for pivotal movement of the planter about the axis of the tractor rear wheels 3. It will also be noted that the knuckle cooperates with the hitch yoke 16 and with the hitch guide coupling 26 to resist sagging of the planter frame and hitch yoke in any position of pivotal displacement of the planter frame relative to the hitch yoke 16 about the axis of the standard 23 as long as said axis extends in a substantially vertical direction, and that in normal operation of the machine a substantially vertical position of the standard 23 is insured by the coaction of the wheeled axle 70 with the ground and with the planter frame and by the supporting connection of the planter frame with the tractor. When the machine is propelled over uneven ground and the front wheels 5 of the tractor ascend an obstruction, such movement of the tractor will not affect the depth of soil penetration of the furrow openers since rocking of the tractor body about the axis of its rear wheels imparts no up or down movement to the front end of the planter. Similarly, if the tractor should rock transversely to its direction of propulsion in a manner similar to the rolling of a ship, such rolling of the tractor will not be transmitted to the planter because of the pivotal connection between the hitch yoke 16 and the knuckle by means of the pivot pin 21.

Referring to Figs. 2, 3 and 4, a rocker 80 has arms at opposite sides of the upstanding portion of the bracket 22 of the knuckle, and the rocker is pivotally connected with the knuckle by means of pivot bolts extending through the arms of the rocker, one of these pivot bolts being indicated at 81 in Fig. 4. A pin 82 is pivotally secured between the arms of the rocker arm 80 at 83 and extends through a trunnioned washer 84 pivotally mounted between lugs 85 and 86 of the bracket 22. A spring 87 bears at its lower end upon the trunnioned washer 84 and at its upper end against a head of the pin 82. A convex roller 88 is rotatably mounted between the forward ends of the arms of the rocker 80, and the roller 88 bears upon the rear end of the tractor draw bar 11. As shown in Fig. 2 the point of contact between the roller 88 and the tractor draw bar 11 lies substantially in line with the axis of the pin 21, and the roller therefore does not substantially interfere with pivotal movement of the knuckle about the pin 21. The spring 87 urges the roller 88 into contact with the draw bar 11, and this action of the spring 87 prevents the transmission of harmful twists to the forward frame section 39, 40 of the planter when the tractor and planter are horizontally angled to a considerable extent. In the alined position of the tractor and planter as shown in Fig. 3, the planter frame section 39, 40 is not subject to harmful transverse twisting forces because it is adequately supported at its front and rear by the standard 23 and the rear frame section 66, respectively. However, if the tractor assumes a horizontally angled position relative to the planter frame, for instance, a right angle position, the tendency of the hitch yoke and planter frame to sag towards the ground is liable to unduly twist the forward planter frame section 39, 40. Such tendency, however, is effectively counteracted by the coaction of the rocker 80 with the knuckle 22, 23 and the tractor draw bar 11. The spring 87 is preferably so proportioned to the load sustained by the knuckle that the rocker 80 normally occupies a position such as shown in Figs. 1 and 2, and in which position the point of contact between the roller 88 and the draw bar 11 substantially coincides, as stated, with the axis of pivotal movement of the knuckle on the pin 21.

When the planter is used as a check-row planter, the rocker shaft 62 on the furrow opener frame 48, 49 is actuated periodically by the operation of the check head 61 in connection with the buttons of a check wire. The power transmitting mechanism 60 has a sprocket wheel 89 which is driven by a chain 90 from a sprocket wheel 91 on the axle 70 of the planter, and whenever the fork of the check head is actuated by contact with a button on the check wire, the rocker shaft 62 is swung against the action of the spring 64 into a position to establish driving connection between the power transmitting mechanism 60 and the seeder shaft 59, and to open the valves of the seed depositing mechanisms. In order to operate the planter as a drill planter it is necessary to hold the rocker shaft 62 in its drive establishing and valve opening position so that seed may be continuously fed from the seed cams through the planter shanks while the implement is being propelled by the tractor. Upon arrival of the machine at the end of the field it is then necessary to move the rocker shaft 62 into a position in which the drive to the seeder shaft is interrupted and the valves are closed, and provisions are made in the planter shown to automatically move the rocker shaft into its inoperative position simultaneously with the lifting of the furrow openers out of the ground by manipulation of the lever 46. The mechanism for actuating the rocker shaft 62 simultaneously with the manipulation of the hand lever 46 comprises a curved arm 92 which is pivoted on the latch segment 41 by means of the bolt 42. The curved arm 92 has a slot 93 which is engaged by a pin 94 secured to the double armed lever 32, 33, and the free end of the arm 92 is pivotally connected with a rod 95 extending rearwardly towards the arm 63 of the rocker shaft 62. The rod 95 has a looped end slidably engaging a pin on the arm 63, and the length of the rod 95 is such that the rocker shaft 62 is held in its operative position by the rod 95 against the action of the spring 64 when the planter is adjusted to the position in which it is shown in Fig. 1 and in which the furrow openers are lowered into the ground. It should be noted that the lower part of the slot 93 of the arm 92 extends on an arc whose center coincides with the pivot axis of the lever 32, 33 when the hand lever 46 occupies the position in which it is shown in Fig. 1. Due to this arrangement the depth of soil penetration of the furrow openers 58 may be regulated by manipulation of the hand lever 46 without causing substantial movement of the rod 95, but when the lever 46 is moved backwardly far enough so as to raise the furrow openers 58 entirely out of the ground, the pin 94 engages the upper part of the slot 93 which is not concentric with the pivot axis of the hand lever, and during the last part of the raising movement of the lever 46, the arm 92 will therefore be actuated to swing rearwardly and permit movement of the rocker shaft 62 into its inoperative position. When the planter is operated as a check-row planter, the rod 95 is disconnected from the arm 92, and a clamping device 96 on the side bar 39 of the planter frame holds the rod 95 in position on the planter frame.

Figure 12:
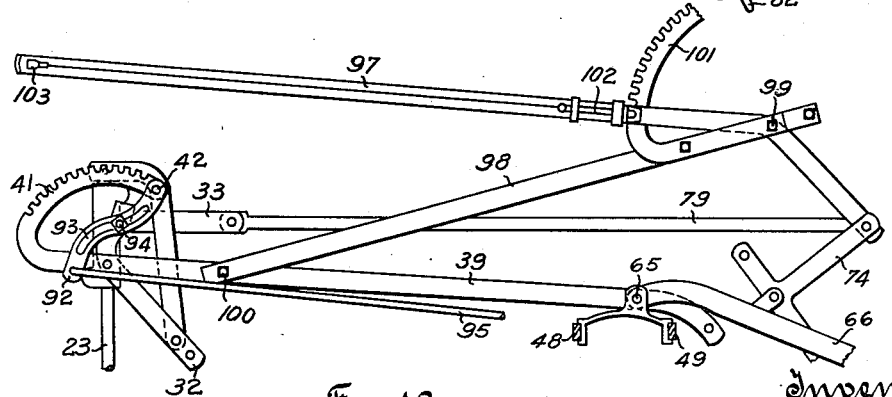
Fig. 12 shows a modified raising and lowering mechanism for use in connection with a planter of the type shown in Fig. 1.

Fig. 12 shows a modified actuating mechanism for raising and lowering the furrow openers relative to the ground. In the modified construction as shown in Fig. 12 the hand lever 46 is removed from the double armed lever 32, 33, and the rearward lever 74 on the rear frame of the planter is actuated by a hand lever 97. A strut 98 has rearwardly converging arms whose forward ends are pivoted at 100 on the side bars 39 and 40 of the forward section of the planter frame. The hand lever 97 is pivoted at 99 between the converged rear ends of the side arms of the strut 98. A latch segment 101 is fixedly secured to the strut 98 and curved concentrically with the fulcrum 99 of the hand lever 97 on the strut 98. A retractable locking dog 102 is mounted on the hand lever 97 for cooperation with the latch segment 101 and operable by a latch lever 103 near the handle end of the lever 97 to hold the hand lever 97 in different adjusted positions relative to the strut 98. A rearwardly and downwardly inclined arm of the hand lever 97 is connected with the rear lever 74 of the lifting mechanism at the pivotal connection between the lever 74 and the link 79, and it will be seen that manipulation of the hand lever 97 in an upward direction from the position in which it is shown in Fig. 12 will cause downward movement of the furrow openers 58 in substantially the same manner as forward movement of the hand lever 46 in Fig. 2 causes downward movement of the furrow openers 58. The operating rod 95 for the rocker shaft 62 in the mechanism shown in Fig. 12 is operated in the same manner as in the mechanism shown in Figs. 1 and 2, i. e. the rod 95 will be moved forwardly when the lever 97 is moved upwardly in order to lower the furrow openers into the ground and by this movement of the rod 95 the rocker shaft 62 is moved into a drive establishing and valve opening position. During the last part of the lowering movement, the pin 94 on the double armed lever 32, 33 slides within the arcuate portion of the slot 93 of the arm 92 so that the depth of soil penetration of the furrow openers may be adjusted while the rocker shaft 62 is maintained in its drive establishing and valve opening position.

In the arrangement of the mechanism as shown in Fig. 12 the handle end of the lever 97 extends into proximity of the forward end of the planter, whereas in the arrangement of the mechanism shown in Figs. 1 and 2 the forward end of the hand lever 46 extends substantially in advance of the planter when the lever is moved to a position corresponding to a lowered position of the furrow openers as shown in Fig. 1. In the arrangement of the mechanism as shown in Fig. 1, as well as in the arrangement of the mechanism shown in Fig. 12, the handle end of the depth adjusting lever 46 or 97 is always within easy reach of an operator seated on the driver's seat 8 of the tractor. It will be noted that the construction using a hand lever projecting forwardly from the planter, such as the hand lever 46 shown in Fig. 1, can only be used in connection with a tractor whose rear end construction affords sufficient space for manipulation of the forwardly extending hand lever. The construction shown in Fig. 12 lends itself for use in connection with a tractor whose rear end construction is such as to prohibit the use of a forwardly extending depth adjusting lever such as the lever 46 shown in Fig. 1.

It is claimed and desired to secure by Letters Patent:

1. In combination with a tractor having wheeled front and rear supports, a rigid hitch member connected with said tractor for pivotal movement relative thereto about an axis substantially coinciding with the wheel axis of said support, an implement adapted to be drawn by said tractor having a frame, coupling means connecting said frame and hitch member for pivotal movement relative to each other about a substantially vertical axis, said coupling means including a first coupling element associated with said hitch member and a second coupling element associated with said frame adjustable relative to said first coupling element in the direction of said vertical axis and cooperating with said first coupling element to resist sagging of said frame and hitch member in any position of pivotal displacement of said frame relative to said hitch member about said vertical axis, raising and lowering means for said frame including a mechanism for adjusting said second coupling element relative to said first coupling element along said vertical axis, and a ground engaging support connected with a rearward portion of said frame.

2. In combination with a tractor having wheeled front and rear supports, a rigid hitch member connected with said tractor for pivotal movement relative thereto about an axis substantially coinciding with the wheel axis of said rear support, an implement adapted to be drawn by said tractor having a frame, coupling means connecting said frame and hitch member for pivotal movement relative to each other about a substantially vertical axis, said coupling means including a first coupling element associated with said hitch member and a second coupling element associated with said frame adjustable relative to said first coupling element in the direction of said vertical axis and cooperating with said first coupling element to resist sagging of said frame and hitch member in any position of pivotal displacement of said frame relative to said hitch member about said vertical axis, ground engaging supporting means adjustably connected with said frame rearwardly of said coupling means and permitting vertical adjustment of said frame relative to the ground, and raising and lowering means for said frame comprising mechanism for adjusting said second coupling element relative to said first coupling element along said vertical axis, and mechanism for adjusting said frame vertically relative to said last named ground engaging supporting means.

3. In combination with a tractor having wheeled front and rear supports, a rigid hitch member connected with said tractor for pivotal movement relative thereto about an axis substantially coinciding with the wheel axis of said rear support, an implement adapted to be drawn by said tractor having a frame, coupling means connecting said frame and hitch member for pivotal movement relative to each other about a substantially vertical axis, said coupling means including a first coupling element associated with said hitch member and a second coupling element associated with said frame adjustable relative to said first coupling element in the direction of said vertical axis and cooperating with said first coupling element to resist sagging of said frame and hitch member in any position of pivotal displacement of said frame relative to said hitch member about said vertical axis, ground engaging supporting means adjustably connected with said frame rearwardly of said coupling means and permitting vertical adjustment of said frame relative to the ground, and means for raising and lowering said frame in substantially parallel relation to the ground comprising mechanism for adjusting said second coupling element relative to said first coupling element along said vertical axis and an actuating connection between said mechanism and said last named ground engaging support.

4. In combination with a tractor, a hitch member mounted on said tractor for vertical swinging movement relative thereto, a knuckle adapted to receive draft from said hitch member and connected therewith for pivotal movement about a first axis extending substantially in the direction of said draft, an implement having a frame and a pair of axially spaced supporting wheels therefor, means supportingly connecting said frame with said knuckle and with said wheels, including mechanism operable to adjust said frame vertically relative to the ground, and a draft transmitting connection between said frame and said knuckle securing said frame to said knuckle for pivotal movement about a second axis extending transversely of said first axis and of the axis of said wheels.

5. In combination with a tractor, a hitch member mounted on said tractor for vertical swinging movement relative thereto, a knuckle adapted to receive draft from said hitch member and connected therewith for pivotal movement about a first axis extending substantially in the direction of said draft, a frame having a rear portion supported on a pair of axially spaced ground wheels and a forward portion connected with said knuckle for pivotal movement about a second axis extending transversely of said first axis and transversely of the axis of said ground wheels, and means cooperating with said knuckle and said frame for adjusting the latter relative to said knuckle longitudinally of said second axis.

6. In combination with a tractor, a hitch member mounted on said tractor for vertical swinging movement relative thereto, a knuckle adapted to receive draft from said hitch member and connected therewith for pivotal movement about a first axis extending substantially in the direction of said draft, an implement having a frame and a pair of axially spaced ground wheels connected therewith for vertical adjustment of said frame relative to said wheels, said frame being connected with said knuckle for pivotal movement about a second axis extending transversely of said first axis and transversely of the axis of said ground wheels, means mounted on said frame and cooperating with said knuckle for adjusting said frame relative to said knuckle longitudinally of said second axis, and means operatively supported by said wheels and operatively connected with said adjusting means and with said frame for adjusting the latter vertically of the axis of said ground wheels by manipulation of said adjusting means.

7. In combination with a tractor, hitch means comprising a hitch member connected with said tractor for vertical swinging movement relative thereto about a first axis extending transversely of the tractor, a knuckle adapted to receive draft from said hitch member and connected therewith for pivotal movement about a second axis extending transversely of said first axis, an implement having a frame and a pair of axially spaced supporting wheels connected therewith, means connecting said frame and knuckle for pivotal movement relative to each other about a third axis extending transversely of said second axis and of the axis of said supporting wheels, whereby a portion of said frame remote from said supporting wheels is sustained on said tractor for pivotal movements about said first, second and third axes, and means including relatively engageable supports associated respectively with said tractor and hitch means for opposing downward swinging movement of said frame about said first axis, said support associated with said tractor being arranged to supportingly engage said support associated with said hitch means while said tractor and implement occupy their normal positions relative to the ground.

8. In a hitch for use in connection with a draft vehicle, a hitch member connectable with said draft vehicle for vertical swinging movement relative thereto about a first axis extending transversely of said draft vehicle, a knuckle adapted to receive draft from said hitch member and connected therewith for pivotal movement about a second axis extending transversely of said first axis, a coupling element pivoted on said knuckle for movement relative thereto about a third axis extending transversely of said second axis, whereby a drawn vehicle having a pair of axially spaced ground wheels at one end thereof and connected at its other end with said coupling element may be sustained at said other end thereof on said draft vehicle for pivotal movement relative thereto about said first, second and third axes, and an arm connected with said knuckle and adapted to cooperate with said draft vehicle to limit downward swinging movement of said hitch member relative to said draft vehicle.

9. In combination with a draft vehicle, a hitch member connected with said draft vehicle for vertical swinging movement relative thereto about a first axis extending transversely of said draft vehicle, a knuckle adapted to receive draft from said hitch member and connected therewith for pivotal movement about a second axis extending transversely of said first axis, a coupling element pivoted on said knuckle for movement relative thereto about a third axis extending transversely of said second axis, whereby a drawn vehicle having a pair of axially spaced ground wheels at one end thereof and connected at its other end with said coupling element may be sustained at said other end thereof on said draft vehicle for pivotal movement relative thereto about said first, second and third axes, an arm connected with said knuckle, and an element on said draft vehicle extending under an end portion of said arm, said end portion of said arm cooperating with said element at a point in substantial alinement with said second axis to limit downward swinging movement of said hitch member relative to said draft vehicle.

10. In combination with a draft vehicle, a hitch member connected with said draft vehicle for vertical swinging movement relative thereto about a first axis extending transversely of said draft vehicle, a knuckle adapted to receive draft from said hitch member and connected therewith for pivotal movement about a second axis extending transversely of said first axis, a coupling element pivoted on said knuckle for movement relative thereto about a third axis extending transversely of said second axis, whereby a drawn vehicle having a pair of axially spaced ground wheels at one end thereof and connected at its other end with said coupling element may be sustained at said other end thereof on said draft vehicle for pivotal movement relative thereto about said first, second and third axes, an arm connected with said knuckle for movement relative thereto in a plane through said second and third axes, means cooperating with said arm and knuckle to resiliently resist upward movement of said arm, and an element mounted on said draft vehicle in position to extend under said arm, whereby said hitch member will be resiliently sustained in a predetermined position due to engagement of said arm with said element.

11. In combination with a draft vehicle, a hitch member connected with said draft vehicle for vertical swinging movement relative thereto about a first axis extending transversely of said draft vehicle, a knuckle adapted to receive draft from said hitch member and connected therewith for pivotal movement about a second axis extending transversely of said first axis, a coupling element pivoted on said knuckle for movement relative thereto about a third axis extending transversely of said second axis, whereby a drawn vehicle having a pair of axially spaced ground wheels at one end thereof and connected at its other end with said coupling element may be sustained at said other end thereof on said draft vehicle for pivotal movement relative thereto about said first, second and third axes, an arm connected with said knuckle for movement relative thereto in a plane through said second and third axes, means cooperating with said arm and knuckle to resiliently resist upward movement of said arm, and an element mounted on said draft vehicle in position to extend under an end portion of said arm, said end portion being adapted to move to a position in substantial alinement with said second axis, and said resilient means being effective to hold said end portion in said position while said hitch member is sustained thereby in a balanced position due to engagement of said arm with said element.

12. In combination with a draft vehicle, a hitch member connected with said draft vehicle for vertical swinging movement relative thereto about a first axis extending transversely of said draft vehicle, a knuckle adapted to receive draft from said hitch member and connected therewith for pivotal movement about a second axis extending transversely of said first axis, a coupling element pivoted on said knuckle for movement relative thereto about a third axis extending transversely of said second axis, whereby a drawn vehicle having a pair of axially spaced ground wheels at one end thereof and connected at its other end with said coupling element may be sustained at said other end thereof on said draft vehicle for pivotal movement relative thereto about said first, second and third axes, a rocker arm pivotally mounted on said knuckle for movement in a plane through said second and third axes, a convex roller rotatably mounted on said arm, a bar mounted on said draft vehicle in position to extend under said roller, and means including a spring cooperating with said arm and knuckle to resiliently sustain said hitch member against downward swinging movement by engagement of said roller with said bar.

13. In an agricultural implement adapted to be drawn by a tractor, a frame, a supporting standard having vertical sliding connection with a forward portion of said frame, a double armed forward lever pivotally mounted on said frame, a first link pivotally connected at one end with one arm of said lever and supportingly connected at the other end with said standard, a wheeled support connected with a rearward portion of said frame for movement of said frame vertically of the wheel axis of said support, means including a rearward lever mounted on said wheeled support for adjusting the rear of said frame vertically of said wheel axis, a second link pivotally connected at one end with the other arm of said forward lever and at the other end with said rearward lever, a latch segment connected with said frame, and a hand lever cooperating with said latch segment and one of said forward and rearward levers to maintain said frame in vertically fixed relation to the ground, said hand lever having a handle end adapted to extend within reach of an operator on said tractor.

14. In an agricultural implement adapted to be drawn by a tractor, a frame, a supporting standard having vertical sliding connection with a forward portion of said frame, a double armed forward lever pivotally mounted on said frame, a first link pivotally connected at one end with one arm of said lever and supportingly connected at the other end with said standard, a wheeled support connected with a rearward portion of said frame for movement of said frame vertically of the wheel axis of said support, means including a rearward lever mounted on said wheeled support for adjusting the rear of said frame vertically of said wheel axis, a second link pivotally connected at one end with the other arm of said forward lever and at the other end with said rearward lever, a latch segment rigidly connected with said frame, and a handle arm rigidly connected with said forward lever and lockable with said latch segment in different positions of pivotal adjustment of said forward lever about its pivot axis.

15. In an agricultural implement adapted to be drawn by a tractor, a frame, a supporting standard having vertical sliding connection with a forward portion of said frame, a double armed forward lever pivotally mounted on said frame, a first link pivotally connected at one end with one arm of said lever and supportingly connected at the other end with said standard, a wheeled support connected with a rearward portion of said frame for movement of said frame vertically of the wheel axis of said support, means including a rearward lever mounted on said wheeled support for adjusting the rear of said frame vertically of said wheel axis, a second link pivotally connected at one end with the other arm of said forward lever and at the other end with said rearward lever, a strut pivotally secured to said frame, a hand lever having pivotal connection with said strut and operatively connected with said adjusting means for the rear of said frame, and means cooperating with said strut and hand lever for locking said hand lever in different positions of pivotal adjustment thereof about its pivotal connection with said strut.

16. In an agricultural implement adapted to be drawn by a tractor, a frame, a supporting standard having vertical sliding connection with a forward portion of said frame, a double armed forward lever pivotally mounted on said frame, a first link pivotally connected at one end with one arm of said lever and supportingly connected at the other end with said standard, a wheeled support connected with a rearward portion of said frame for movement of said frame vertically of the wheel axis of said support, means including a rearward lever mounted on said wheeled support for adjusting the rear of said frame vertically of said wheel axis, a second link pivotally connected at one end with the other arm of said forward lever and at the other end with said rearward lever, a strut pivotally secured to said frame, a hand lever fulcrumed on said strut and having an arm pivotally connected with said rearward lever at the pivotal connection of the latter with said second link, and means cooperating with said strut and hand lever for locking said hand lever in different positions of pivotal adjustment thereof about its fulcrum axis on said strut.

17. In combination with a tractor having wheeled front and rear supports, a rigid hitch member connected with said tractor for pivotal movement relative thereto about a first axis substantially coinciding with the wheel axis of said rear support, a first coupling element having a pivot member, means connecting said first coupling element with said hitch member to position said pivot member in angularly fixed relation to a second axis extending transversely of said first axis, an implement adapted to be drawn by said tractor having a frame, a ground engaging rear support for said frame, a second coupling element fixedly secured to said frame and having a portion on a vertically disposed axis rotatably engaging said pivot member of said first coupling element, and means supportingly connecting said frame with said hitch member and with said last named rear support including mechanism for adjusting said frame vertically relative to the ground.

18. In combination with a tractor having wheeled front and rear supports, a rigid hitch member connected with said tractor for pivotal movement relative thereto about a first axis substantially coinciding with the wheel axis of said rear support, a first coupling element having a pivot member, means connecting said first coupling element with said hitch member to position said pivot member in angularly fixed relation to a second axis extending transversely of said first axis, an implement adapted to be drawn by said tractor having a frame, a ground traversing support adjustably connected with a rearward portion of said frame for vertical adjustment of said frame relative to said ground traversing support, a second coupling element fixedly secured to a forward portion of said frame and having a portion on a vertically disposed axis rotatably engaging said pivot member of said first coupling element, and mechanism for adjusting said frame vertically relative to said ground traversing support.

19. In combination with a tractor, hitch means comprising a hitch member connected with said tractor for vertical swinging movement relative thereto about a first axis extending transversely of the tractor, a first coupling element having a pivot member, means connecting said first coupling element with a portion of said hitch member rearwardly of said first axis to position said pivot member in angularly fixed relation to a second axis extending transversely of said first axis, a trailing vehicle having a frame and a pair of axially spaced supporting wheels connected therewith, a second coupling element fixedly secured to said frame and having a portion on a vertically disposed third axis rotatably engaging said pivot member of said first coupling element, means supportingly connecting said frame with said hitch member whereby a portion of said frame remote from said supporting wheels is sustained on said tractor for pivotal movements about said first and third axes, and load transmitting means associated, respectively, with said tractor and with said hitch member to afford an auxiliary support for said hitch member, one of said load transmitting means including a resiliently movable element and the other a stop arranged in the path of said resiliently movable element and in such relation thereto that said resiliently movable element bears upon said stop to resist downward swinging movement of said rearward portion of said hitch member while said tractor and trailing vehicle occupy their normal positions relative to the ground.

JOHN D. McKAHIN.

CERTIFICATE OF CORRECTION.

Patent No. 2,248,505.  July 8, 1941.

JOHN D. McKAHIN.

It is hereby certified that error appears in the printed specification of the above numbered patent requiring correction as follows: Page 5, second column, line 38, claim 1, after the word "said" insert --rear--; and that the said Letters Patent should be read with this correction therein that the same may conform to the record of the case in the Patent Office.

Signed and sealed this 2nd day of September, A. D. 1941.

(Seal)

Henry Van Arsdale,
Acting Commissioner of Patents.